(12) United States Patent
Sever et al.

(10) Patent No.: US 11,193,708 B2
(45) Date of Patent: Dec. 7, 2021

(54) METHODS FOR PRE-CHARGING CARBON DIOXIDE SNOW

(71) Applicants: Robert Sever, Northbrook, IL (US); Ranko Bursac, Libertyville, IL (US); Ying Zhou, Naperville, IL (US)

(72) Inventors: Robert Sever, Northbrook, IL (US); Ranko Bursac, Libertyville, IL (US); Ying Zhou, Naperville, IL (US)

(73) Assignee: Praxair Technology, Inc., Danbury, CT (US)

(*) Notice: Subject to any disclaimer, the term of this patent is extended or adjusted under 35 U.S.C. 154(b) by 54 days.

(21) Appl. No.: 16/223,233

(22) Filed: Dec. 18, 2018

(65) Prior Publication Data

US 2019/0195548 A1    Jun. 27, 2019

Related U.S. Application Data

(60) Provisional application No. 62/608,278, filed on Dec. 20, 2017.

(51) Int. Cl.
*F25D 3/12* (2006.01)
*C01B 32/55* (2017.01)
(Continued)

(52) U.S. Cl.
CPC ........... *F25D 3/125* (2013.01); *A01N 1/0252* (2013.01); *A01N 1/0273* (2013.01); *C01B 32/55* (2017.08);
(Continued)

(58) Field of Classification Search
CPC ..... F25D 3/125; F25D 25/005; A01N 1/0252; A01N 1/0273; C01B 32/55; F17C 6/00; G06Q 10/0837; G06Q 10/0832
See application file for complete search history.

(56) References Cited

U.S. PATENT DOCUMENTS 1,770,944 A   7/1930  Payson
3,667,242 A   6/1972  Kilburn
(Continued)

FOREIGN PATENT DOCUMENTS

DE   10129217 A1   1/2003
EP    0854334 A1   7/1998
(Continued)

OTHER PUBLICATIONS https://www.savsu.com/new-index/#evo-80c; EVO-80° C. "dry ice".

*Primary Examiner* — Ana M Vazquez
(74) *Attorney, Agent, or Firm* — Nilay S. Dalal

(57) ABSTRACT

Manual and automated methods of pre-charging an empty or partially empty insulated container with CO2 snow are provided. A first location such as a charging location charges CO2 liquid into a container to create a pre-charged container with CO2 snow. The charging location prepares the pre-charged container for delivery to a second location, either by itself, or through a third party. The second location may be a clinical site, which upon receipt of the pre-charged container, loads a perishable item such as a biological sample into the pre-charged container. A user receives the pre-charged container with perishable item and removes the perishable item from the pre-charger container for testing (e.g., biological testing). Depending on the level of depletion of the CO2 snow in the pre-charged container, the user returns the depleted container to the first location or the intermediate location.

35 Claims, 8 Drawing Sheets

(51) Int. Cl.
  *G06Q 10/08* (2012.01)
  *F25D 25/00* (2006.01)
  *A01N 1/02* (2006.01)

(52) U.S. Cl.
  CPC ....... *F25D 25/005* (2013.01); *G06Q 10/0832* (2013.01); *G06Q 10/0837* (2013.01); *F25D 2303/085* (2013.01); *F25D 2331/809* (2013.01); *F25D 2331/8014* (2013.01); *F25D 2500/06* (2013.01)

(56) References Cited

U.S. PATENT DOCUMENTS

| | | | |
|---|---|---|---|
| 4,206,616 A | 6/1980 | Frank et al. | |
| 5,257,503 A | 11/1993 | Rhoades et al. | |
| 5,511,379 A | 4/1996 | Gibot et al. | |
| 5,528,907 A | 6/1996 | Pint et al. | |
| 5,548,974 A | 8/1996 | Rhoades | |
| 5,993,165 A | 11/1999 | Lorimer et al. | |
| 6,044,650 A | 4/2000 | Cook et al. | |
| 6,209,341 B1 | 4/2001 | Benedetti et al. | |
| 6,467,642 B2 | 10/2002 | Mullens et al. | |
| 6,584,802 B1 | 7/2003 | Cofield et al. | |
| 7,226,552 B2 | 6/2007 | Manini et al. | |
| 7,275,395 B1 | 10/2007 | Ventura | |
| 7,310,967 B2 | 12/2007 | Aragon | |
| 7,908,870 B2* | 3/2011 | Williams | F25D 3/08 62/62 |
| 8,469,228 B2 | 6/2013 | Adams | |
| 9,275,508 B1 | 3/2016 | Lavra et al. | |
| 2006/0045754 A1 | 3/2006 | Lukens | |
| 2007/0170201 A1 | 7/2007 | Steffens | |
| 2008/0083763 A1 | 4/2008 | Nielsen | |
| 2014/0157797 A1* | 6/2014 | Kovalick | F25D 3/06 62/60 |
| 2016/0260161 A1 | 9/2016 | Atchley et al. | |
| 2016/0334062 A1 | 11/2016 | Kermaidic et al. | |
| 2017/0206497 A1 | 7/2017 | Rechard | |
| 2018/0299193 A1 | 10/2018 | Burkot et al. | |

FOREIGN PATENT DOCUMENTS

| | | |
|---|---|---|
| EP | 2604956 A1 | 6/2013 |
| EP | 2873937 A1 | 5/2015 |
| EP | 2881646 A1 | 6/2015 |
| EP | 3032195 A1 | 6/2016 |
| EP | 3173715 A1 | 5/2017 |
| GB | 2030277 A | 4/1980 |
| JP | 3029950 B2 | 4/2000 |
| WO | 2014006281 A1 | 1/2014 |
| WO | 2015082704 A1 | 6/2015 |

* cited by examiner

Step 1: beginning of the dispensing process

Step 2: intermediate step of the dispensing process

Step 3: end of the dispensing process

METHODS FOR PRE-CHARGING CARBON DIOXIDE SNOW

CROSS REFERENCE TO RELATED APPLICATION

This application claims the benefit of priority to U.S. provisional application Ser. No. 62/608,278 filed Dec. 20, 2017, the disclosure of which is incorporated by reference herein in its entirety.

FIELD OF INVENTION

This invention relates to manual and automated methods for pre-charging CO2 snow within a container.

BACKGROUND OF THE INVENTION

Drug development continues to be a major endeavor in the pharmaceutical industry. Drug development requires clinical trials to establish the safety and efficacy of new treatments. Today, in the United States, alone, there are a large number of on-going clinical trials in various stages. Each clinical trial can involve hundreds to thousands of patients who have volunteered to the administering of certain experimental drugs. Generally speaking, as part of the clinical trial, biological samples (e.g., tissue, urine, blood samples) are collected from participants at a clinical site, such as a hospital, university, or physician office, and then transported to laboratories for analysis or to facilities where they may be stored frozen for analysis at a later time.

The ability to evaluate the safety and efficacy of an experimental drug requires obtaining reproducible and reliable results during the clinical trials. The biological samples must be stabilized and preserved during storage and transport between, by way of example, the clinic and the laboratory. A common means to preserve biological samples today is to freeze and store them in the presence of solid carbon dioxide (i.e., dry ice).

Dry ice systems typically involve manually loading the samples and dry ice into an insulated box, such as a polystyrene box, at the clinical site where the samples are acquired. The insulated box is typically provided to the clinical site by a pharmaceutical company or contract research organization administering the clinical trial. The insulated box components may be provided in an assembled or disassembled state. Assembly of the insulated box and loading of the dry ice can be labor intensive. There may also be considerable cost and inconvenience associated with maintaining a sufficient supply of dry ice at the clinical site. Additionally, the failure to use such dry ice within certain duration can result in significant sublimation losses that cause the dry ice to lose its cooling effect. Further, the insulated box is typically not reusable and must be discarded, thereby creating waste.

Other drawbacks also exist with the transport of samples in conventional insulated boxes. The dry ice cools the interior of the insulated box as it sublimates to carbon dioxide vapor. A number of insulated boxes are available that can maintain a cold interior temperature for various durations up to four or five days. The interior sample space may be uniformly near dry ice temperature upon initial full dry ice loading, but as the dry ice sublimates, significant temperature gradients can arise within the interior sample space, potentially compromising sample quality. The insulated boxes are generally shipped via expedited delivery methods to ensure a sufficiently cold temperature is maintained within the interior sample space. However, should delays or disruptions occur in the shipping lanes, the samples can degrade. As a result of such delays during shipment, additional dry ice may be required to be loaded into the box during transit, which results in increased cost and logistical complexity to the shipment.

One alternative to conventional dry ice shippers is a cryogenic liquid nitrogen-based vapor vessel. Cryogenic liquid nitrogen-based vapor vessels utilize an absorbent to retain the cold nitrogen in the vapor state and avoid the presence of nitrogen in its liquid form. However, such liquid nitrogen-based vapor vessels suffer from drawbacks. One drawback is the time and labor involved in the preparation of the vessel. Specifically, users prepare such vessels by pouring liquid nitrogen into the vessel; waiting several hours to allow for sufficient absorption of the nitrogen onto the absorbent to occur; followed by decanting the excess liquid nitrogen prior to shipment. Substantial handling of the cryogenic liquid nitrogen is necessary, and significant time is required to prepare the liquid nitrogen shipper prior to its usage. Further, the costs associated with the use of liquid nitrogen-based vapor vessels are significantly higher than alternative dry ice vessels.

In view of these drawbacks, there is an unmet need for an improved way for effectively providing containers designed to preserve samples into a container during storage and transport.

SUMMARY OF THE INVENTION

In one aspect, a method of pre-charging an empty or partially empty insulated container with CO2 snow to create a pre-charged container at a first location for transport to a second location, comprising the steps of: receiving a liquid CO2 source at the first location; operably connecting a CO2 snow charger to the empty or the partially empty container and to the liquid CO2 source; generating the CO2 snow within the empty or the partially empty container to create the pre-charged container; preparing the pre-charged container for delivery to the second location.

In a second aspect, a method of supplying a perishable item to a location, comprising the steps, of: receiving a pre-charged container at least partially filled with the CO2 snow inside the pre-charged container; opening the pre-charged container at least partially filled with the CO2 snow; accessing an interior region of the pre-charged container at least partially filled with the CO2 snow; loading the perishable item into the pre-charged container at least partially filled with the CO2 snow, wherein the perishable item is in sufficient proximity to the CO2 snow to maintain a temperature of the perishable item below an upper limit; re-sealing the pre-charged container at least partially filled with the CO2 snow; preparing the pre-charged container at least partially filled with the CO2 snow with the perishable item therein for delivery to the location.

In a third aspect, a method of delivering at least partially depleted CO2 snow pre-charged container, comprising: receiving the at least partially depleted CO2 snow pre-charged container, said at least partially depleted CO2 snow pre-charged container further comprising one or more perishable items in sufficient proximity to the CO2 snow to maintain the temperature of the perishable item below an upper limit; opening the pre-charged container to access the interior of the pre-charged container; removing the one or more perishable items from the pre-charged container; and delivering the precharged container to a location for charging, loading additional perishable items or using at least a portion of the one or more perishable items remaining in the at least partially depleted container.

In a fourth aspect, method of creating a pre-charged insulated container with CO2 snow at a first location for transport to a second location, comprising the steps of: providing a source of CO2 snow at a first location; introducing the CO2 snow into an empty or partially empty container at the first location; creating the pre-charged insulated container; and preparing the pre-charged container for delivery to the second location.

DETAILED DESCRIPTION OF THE INVENTION

Figure 1A:
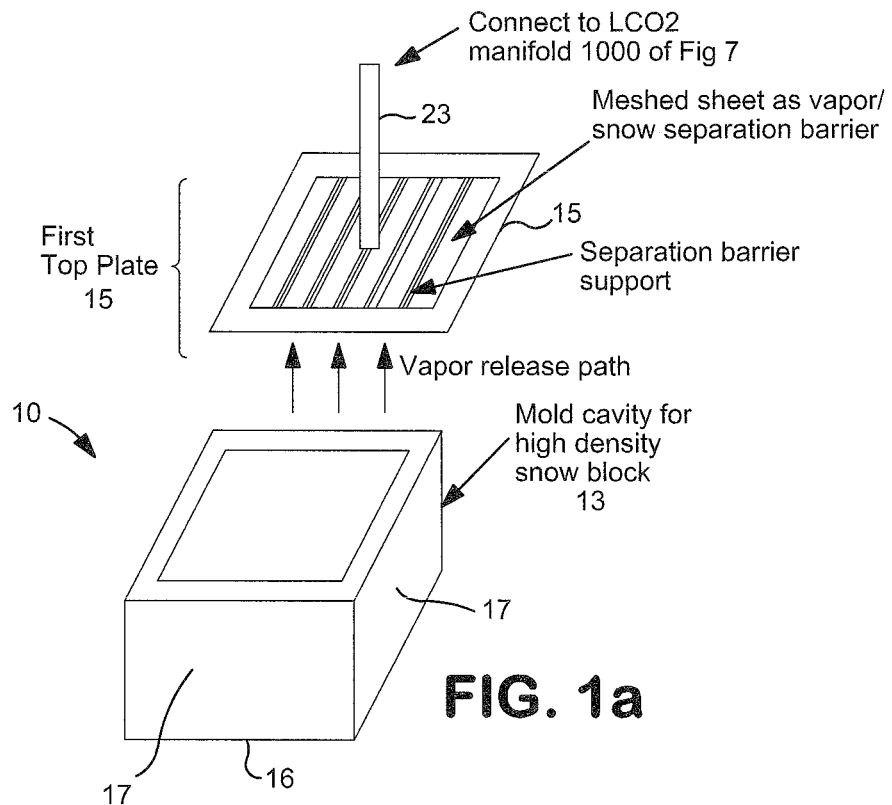
FIG. 1a illustrates a representative perspective view of a container and top plate with fill conduit attached to the top plate to make carbon dioxide (CO2) snow block within an automatic fill dispensing station in accordance with the principles of the present invention.

As will be described, in one aspect, the present invention offers a method for automatically generating various size CO2 snow blocks available from an automatic dispensing station. A user can readily access the generated CO2 snow block from an inlet and outlet accessing window of a conveyor system located within the dispensing station. The on-demand generation of the present invention eliminates the need for a user to maintain an inventory of CO2 snow block or dry ice on-site.

It should be understood that the term "CO2 snow" and "dry ice" have the same meaning and may be used interchangeably herein and throughout to mean particles of solidified CO2.

"CO2 snow block" or "CO2 block," both of which may be used interchangeably herein and throughout, are intended to mean the creation of CO2 snow particles in a substantially block-like form of any shape consisting of tightly held-particles.

"CO2 fluid" as used herein means any phase including, a liquid phase, gaseous phase, vapor phase, supercritical phase, or any combination thereof.

"CO2 source" or "CO2 liquid source" as used herein includes, but is not limited to, cylinders, dewars, bottles, and bulk or microbulk tanks.

"Conduit" or "conduit flow network" as used herein means tube, pipe, hose, manifold and any other suitable structure that is sufficient to create one or more flow paths and/or allow the passage of a fluid.

"Connected" or "operably connected" as used herein means a direct or indirect connection between two or more components, such as piping and assembly, including, but not limited to instrumentation, valves and conduit, unless specified otherwise, so as to enable fluid, mechanical, chemical and/or electrical communication between the two or more components.

"Item" as used herein means any temperature-sensitive goods, products or supplies which may be susceptible to spoilage, degradation, and/or structural alteration or modification if not maintained frozen or below a certain temperature, including, but not limited to, biological samples, such as blood, urine and tissue samples or their constituents; perishable foods, such as meat, poultry, fish and dairy products; personal care items; and chemicals.

"Charging" as used herein means the process of introducing CO2 fluid from an external CO2 source into a container operably connected to the external CO2 source.

"Container" as used herein means any storage, filling, delivery or transportable vessel capable of receiving CO2 fluid, including but not limited to, mold cavities, cylinders, dewars, bottles, tanks, barrels, bulk and microbulk.

"Transportable" means an apparatus that is capable of being moved, transported or shipped from a user location to another destination by any known means, including, but not limited to, air, ground or water. The transport or shipping can occur through various packaged delivery services, including, but not limited to, parcel post, UPS® shipping services, FedEx® shipping services and the like.

The embodiments as described below are by way of example only, and the invention is not limited to the embodiments illustrated in the drawings. It should also be understood that the drawings are not to scale and in certain instances details have been omitted, which are not necessary for an understanding of the embodiments, such as conventional details of fabrication and assembly. It should also be understood that the exact conduit and valving configuration are not drawn to scale, and certain features are intentionally omitted in each of the drawings to better illustrate various aspects of the automated filling and automated charging processes in accordance with the principles of the present invention.

The embodiments are described with reference to the drawings in which similar elements are referred to by like numerals. The relationship and functioning of the various elements of the embodiments are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

Figure 1B:
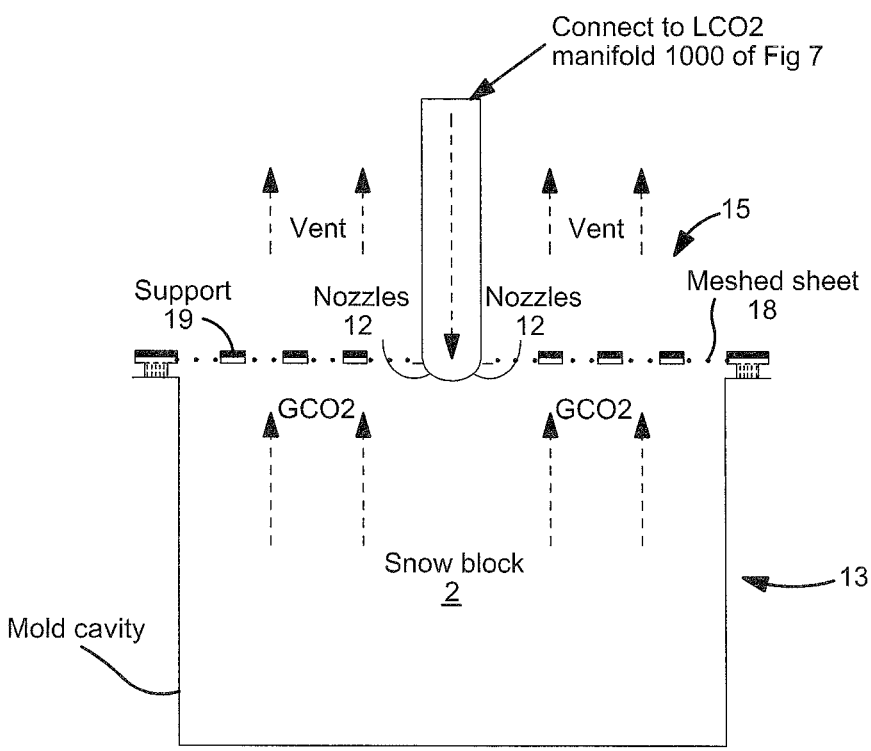
FIG. 1b illustrates a cross-sectional view of FIG. 1a, which shows in detail the gas flow of CO2 through the meshed sheet of the top plate.

In one aspect of the present invention, a method of automatically filling carbon dioxide ($CO_2$) snow block into a selected container within an automatic dispensing station will be discussed with reference to FIGS. 1a, 1b, 2a, 2b, 3, 4, 5, 7, 9a, 9b and 9c. FIGS. 1a and 1b illustrate a first container 10 that is used with the automatic dispensing station 1 (FIGS. 2, 3, 4 and 5) to vend $CO_2$ snow block 2 from the first container 10 into any suitable user box. The first container 10 includes a mold cavity 13 with a first top plate 15. The mold cavity 13 has a volume that is sized to receive the volume of $CO_2$ snow block 2. The desired volume of the $CO_2$ snow block 2 is inputted into a programmable logic controller (PLC) 1085 of the automatic dispensing station 1. The PLC 1085 selects the mold cavity 13, which is located within the automatic dispensing station 1, only when it determines that mold cavity 13 has a volume equal to or larger than the inputted volume of $CO_2$ snow block 2 into the PLC 1085. The PLC 1085 orients the selected mold cavity 13 into a filling orientation (FIG. 2b) and performs an automated filling process to fill the requisite amount of $CO_2$ snow block 2 into the mold cavity 13. The filling process is preferably based on filling time to achieve the desired volume of the $CO_2$ snow block 2.

Upon completion of the fill, the $CO_2$ snow block 2 is transferred from the mold cavity 13 into a user box 22 (FIG. 4) that is vended to a user for pick-up. Specifically, the user box 22 is fed at an inlet window 21 and subsequently conveyed along a conveyor belt 20 to a dispensing window 14 of the automatic dispensing station 1 for a user to access and pick-up.

The structural details of the first container 10 are shown in FIGS. 1a and 1b. The mold cavity 13 generally includes a top plate 15, a bottom wall 16, and multiple vertically oriented side walls 17. Top plate 15 is characterized by a separation barrier support that is permeable only to gaseous $CO_2$ and substantially impermeable to $CO_2$ snow so that gaseous $CO_2$ can escape the interior of mold cavity 13 without significant loss of $CO_2$ snow. Referring to FIG. 1b, the separation barrier support includes a support structure 19 and meshed sheet 18. It be understood that any type of material may be utilized to define passageways for escape of gaseous $CO_2$.

A fill conduit 23 has one end connected to the top plate 15 and another end connected to a $CO_2$ supply manifold 1000. In a preferred embodiment, a total of four nozzles 12 are distributed evenly at the one end of the fill conduit 23. Each nozzle 12 is spaced apart from the other by approximately 90°, and each nozzle 12 has the same sized opening and shape. The structure of the nozzles 12 creates a substantially uniform flow of $CO_2$ fluid therethrough, which allows for the creation of substantially uniform formation and distribution of $CO_2$ snow block 2 within the mold cavity 13. The nozzles 12 are oriented away from a vertical of the fill conduit 23 at an angle ranging from approximately 30° to 60° relative to the vertical of the fill conduit 23, whereby the vertical extends perpendicular to a horizontal surface of the mold cavity 13. It should be understood that other nozzle designs and orientations are contemplated without departing from the scope of the present invention.

Figure 2A:
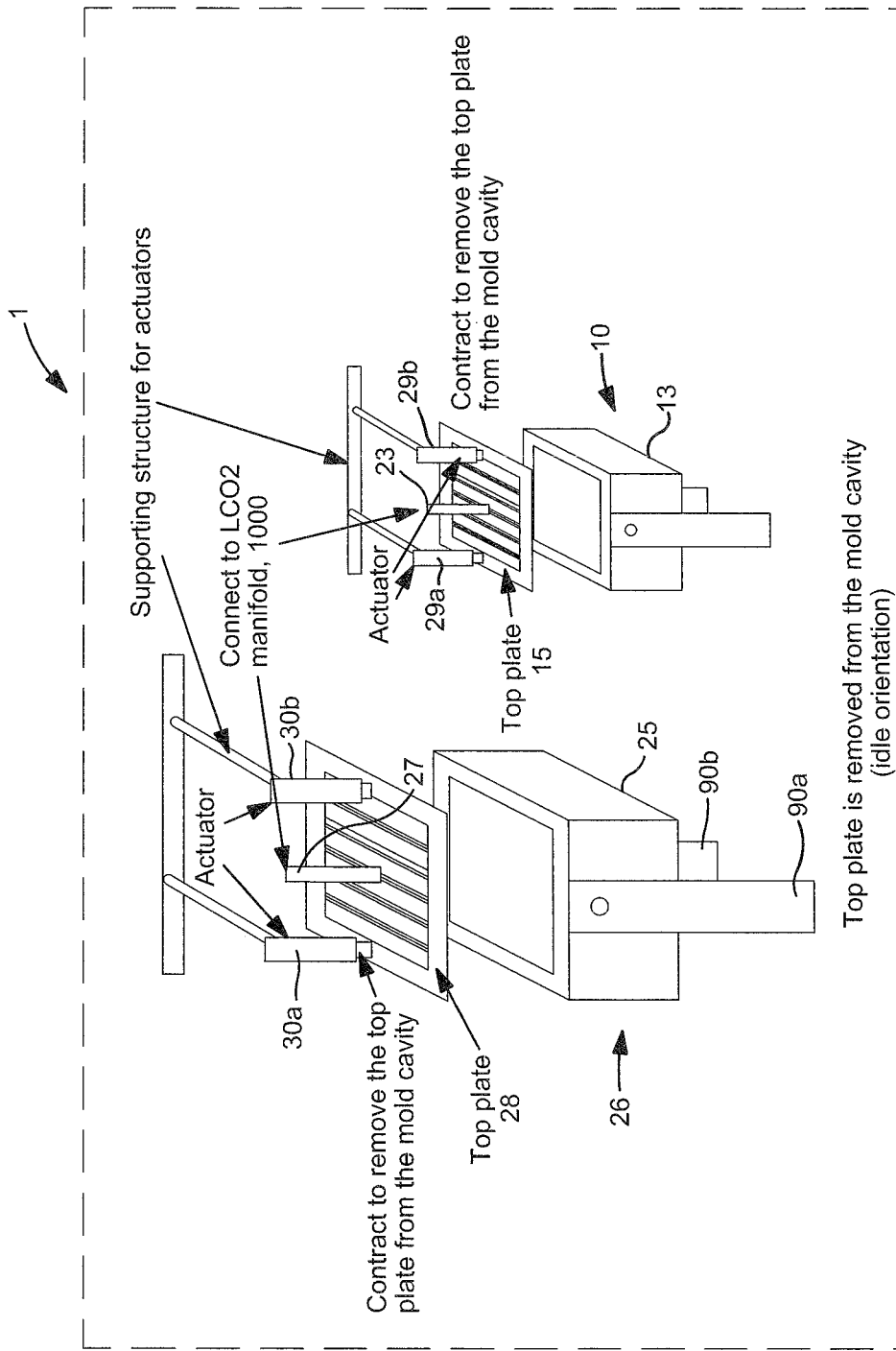
FIG. 2a shows aspects of an automatic dispensing station for generating CO2 snow block within containers of two different sizes, in which each of the containers is shown in a respective idle orientation, in accordance with the principles of the present invention.
Figure 7:
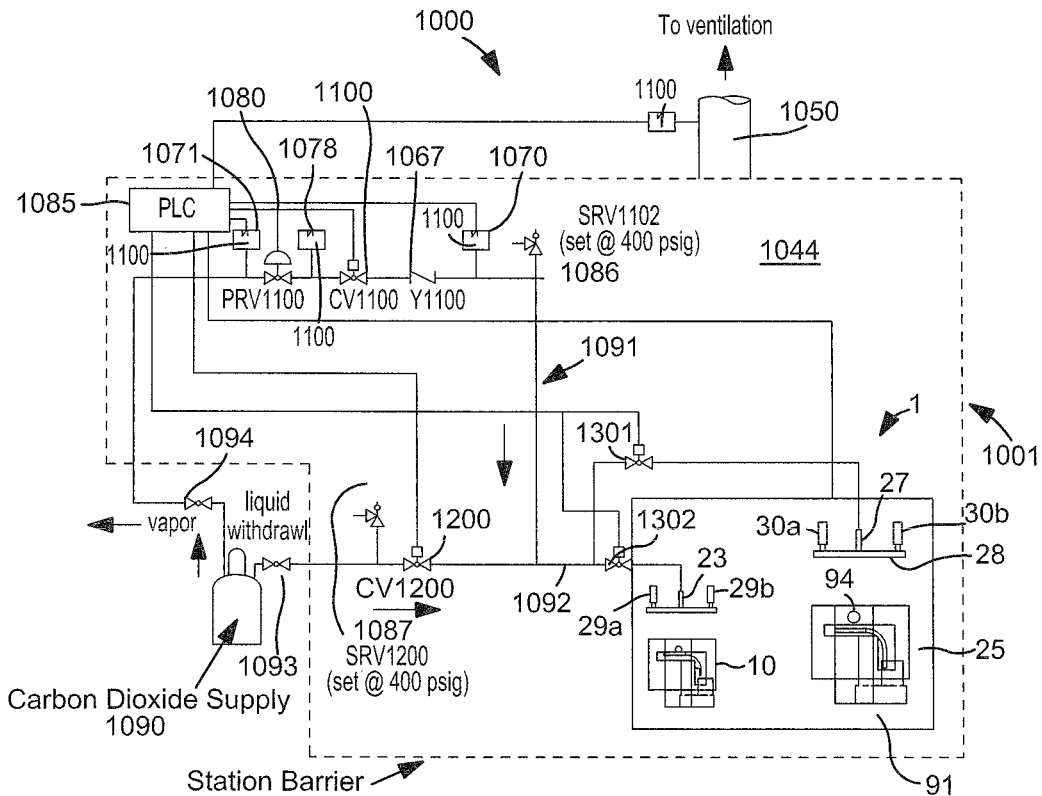
FIG. 7 shows a process flow schematic for introducing CO2 liquid from a CO2 supply manifold that can be utilized into an automatic dispensing station containing multiple containers.

FIG. 2a shows the automatic dispensing station 1 that is designed to contain multiple containers. The dotted line is representative of a structural enclosure of the automatic dispensing station 1 within which multiple containers of different volumes can be contained. Specifically, and for purposes of simplicity to better explain the principles of the present invention, only two containers are shown, namely the first container 10 of FIG. 1a and a second container 26. The first container 10 has a smaller volume than the second container 26. The automatic dispensing station 1 is detachably connected to the $CO_2$ supply manifold 1000, the details of which are shown in FIG. 7. The first container 10 is shown in an idle orientation in which the first container 10 has first top plate 15 removed from top of the first mold cavity 13. Similarly, the second container 26 is shown in an idle orientation in which the second container 26 has second top plate 28 removed from top of the second mold cavity 25. Neither the first container 10 nor the second container 26 in the idle orientation contains $CO_2$ snow block 2. Vertical actuators 29a and 29b are attached to the first top plate 15 and are configured to contract to lift first top plate 15 away from the first container 10 to create the idle orientation. Vertical actuators 29a and 29b are configured to extend and cause first top plate 15 to be lowered onto the first container 10 to create the filling orientation of FIG. 2b. Similarly, vertical actuators 30a and 30b are attached to the second top plate 28 and are configured to lift second top plate 28 away from second container 26 to create the idle orientation, and can be re-configured to extend and cause the second top plate 28 to lower onto the second container 26 to create the filling orientation of FIG. 2b.

The PLC 1085 is in electrical communication with the supply manifold 1000 and the various components of the automatic dispensing station 1 and as a result can regulate the various actuators, valving, including automatic control valves and pressure regulating devices, pressure transducers and ventilation system as shown in FIG. 7. Dotted lines in FIG. 7 extending between the PLC 1085 and the various components represent electrical communication. It should be further understood that the PLC 1085 communicates between the PLC 1085 and the various components, including the first container 10, the second container 26 and the various actuators 29a, 29b, 30a, 30b responsible for lifting and lowering the top plate and the other actuator assemblies 91a, 91b responsible for rotating the mold cavities into a dispensing orientation (as will be explained with reference to FIGS. 9a, 9b and 9c).

Figure 2B:
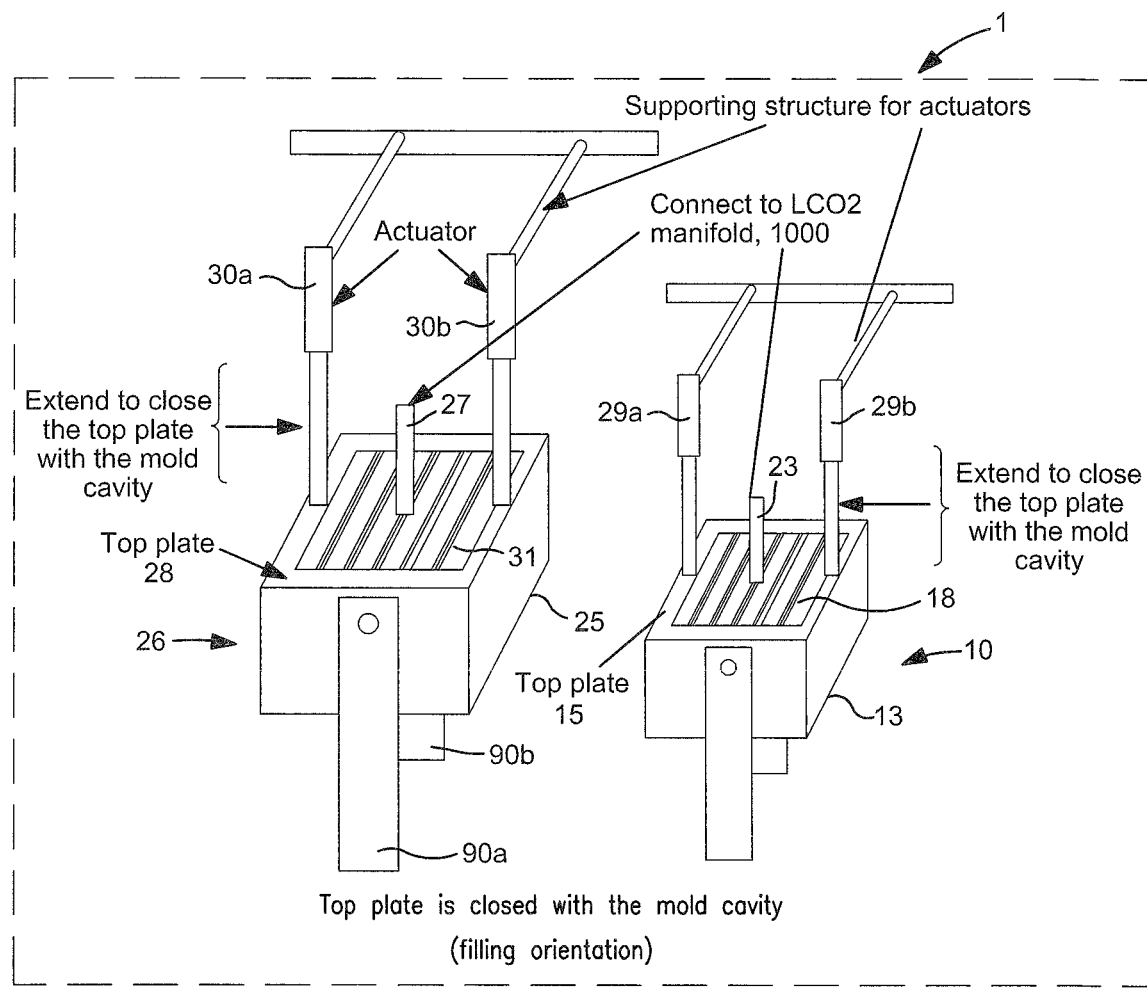
FIG. 2b shows aspects of the automatic dispensing station of FIG. 2a, in which each of the two containers is shown in a respective filling orientation, in accordance with the principles of the present invention.

FIG. 2b shows the first container 10 and the second container 26 in a filling orientation in which the respective top plates 15 and 28 are lowered onto their respective mold cavities 13 and 25 with sufficient pressure to form a seal along the periphery of their respective containers 10 and 26. The peripheral seal ensures that the gaseous $CO_2$ within the mold cavities 13/25 can only escape through the meshed sheet 18 and 31 of first container 10 and second container 26, respectively. Specifically, vertical actuators 29a and 29b are extended relative to FIG. 2a to cause first top plate 15 to lower onto first mold cavity 13 with sufficient pressure to form a seal along the periphery of the first mold cavity 13. Vertical actuators 30a and 30b are extended relative to FIG. 2a to cause second top plate 28 to lower onto second mold cavity 25 with sufficient pressure to form a seal along the periphery of the second mold cavity 25. FIG. 2b shows that first fill conduit 23 and second fill conduit 27 are detachably connected to the CO2 supply manifold 1000 along which CO2 liquid can flow from a CO2 source 1090, which can comprise any suitable container, including but not limited to, cylinders, dewars, bottles, microbulk or bulk tanks.

The automation process in connection with the automatic dispensing station 1 will now be described. In a preferred embodiment, the PLC 1085 is utilized to control the filling and vending of CO2 snow block 2 by the control methodology 5000 of FIG. 5. The PLC 1085 can be situated in close proximity to the automatic dispensing station 1. In this example, and for purposes of simplicity to better explain the principles of the present invention, the automatic dispensing station 1 contains a first container 10 and a second container 25. However, it should be understood that the automatic dispensing station 1 is preferably designed to accommodate a greater number of containers of different volumes. In one example, the PLC 1085 is located as part of the CO2 supply manifold 1000 shown in FIG. 7. The PLC 1085 is preferably pre-programmed with a density of the CO2 snow block 2 to be produced. The PLC 1085 may use any density, but preferably uses 50-65 lb/ft3 and more preferably 55-60 lb/ft3. At step 501, the PLC 1085 may be activated. Next, a user inputs into the PLC 1085 a desired volume of the CO2 snow block 2 to be generated (step 502). The user may also select on a human machine interface (HMI) the size and/or shape of the specific CO2 snow block or container 10/26. The PLC 1085, in response to the inputted volume, selects and activates a suitable container within the automatic dispensing station 1 that has a volume capable of generating the inputted volume of CO2 snow block 2. The PLC 1085 determines that the volume of the mold cavity 13 corresponding to the first container 10 is smaller than the inputted volume. The PLC 1085 further determines that the volume of the mold cavity 25 corresponding to the second container 26 is equal to or larger than the inputted volume of the CO2 snow block 2. As a result, the PLC 1085 selects the second container 26 to be used for the filling of CO2, and accordingly transmits a signal to the second container 26.

A box 22 (e.g., cardboard box) is fed to an inlet window 21 of conveyor system 4, which is located within the automatic dispensing station 1 (step 503). The box 22 may be fed manually by a user or automatically. The box 22 has a volume that is sized to receive the inputted volume of CO2 snow block 2 to be generated within a mold cavity.

Having selected the proper container for filling of CO2 therein; and with the box 22 having been placed along the inlet 21 of the conveyor belt 20 (step 503), the PLC 1085 is ready to perform pre-fill integrity checks (step 504). Numerous criteria must pass before the filling operation can begin. The PLC 1085 verifies that the ventilation system 1050 (FIG. 7) is turned on through pressure switch "PS1000", shown in communication between the exhaust 1050 and PLC 1085. Specifically, the PLC 1085 verifies that the exhaust system has been turned on and is functioning to enable CO2 gas, and CO2 off gas to vent from mold cavity 25 through exhaust conduit 1050 and then to the exhaust system. The PLC 1085 also determines whether the pressure in the supply manifold 1000 and second fill conduit 27 can be maintained without leakage. If any of these pre-fill integrity criteria are not met, the PLC 1085 aborts the operation and sends a message and status to a human machine interface (HMI) for a user to take appropriate corrective action until all of the pre-fill integrity checks pass (step 505).

If each of the pre-fill integrity checks has been satisfied, then the PLC 1085 selects a suitable mold cavity and activates the selected suitable mold cavity from an idle orientation into the filling orientation (step 506). The PLC 1085, in response to the inputted volume of CO2 snow block, selects a suitable container within the automatic dispensing station 1 that has a volume capable of generating the inputted volume of CO2 snow block 2. The PLC 1085 determines that the volume of the mold cavity 13 corresponding to the first container 10 is smaller than the inputted volume. The PLC 1085 further determines that the volume of the mold cavity 25 corresponding to the second container 26 is equal to or larger than the inputted volume of the CO2 snow block 2. As a result, the PLC 1085 selects the second container 26 to be used for the filling of CO2, and accordingly transmits a signal to the second container 26 to activate the second container 26 from the idle orientation (FIG. 2a) into the filling orientation (FIG. 2b) in connection with step 506. Selected second mold cavity 25 in FIG. 2a is shown in the idle orientation with second top plate 28 spaced apart from top of second mold cavity 25. At this juncture, no CO2 snow block 2 is contained within second mold cavity 25. The PLC 1085 transmits signals to vertical actuators 30a and 30b to cause the vertical actuators 30a and 30b to extend downwards in a longitudinal direction as shown in FIG. 2b, thereby causing the second top plate 28 to move downwards towards the top of second container 26. The vertical actuators 30a and 30b continue to move downwards until evenly positioned onto the top of second mold cavity 25 as shown in FIG. 2b. FIG. 2b shows that the second plate 28 has been lowered onto the top of second container 26 with sufficient pressure to form a seal along the periphery of the second containers 26.

The PLC 1085 validates that the selected container 26 is in the filling orientation, and if not, the PLC 1085 will relay appropriate signals to orient the selected container 26 into the filling orientation. Upon verification that the second container 26 is activated into the filling orientation as shown in FIG. 2b, the PLC 1085 can determine the predetermined or expected fill time of CO2 snow block 2 into the selected container 26 (step 507) as follows. The PLC 1085 receives a signal from pressure transducer 1071 (FIG. 7), which measures the pressure of the CO2 in the vapor headspace of source 1090. Pressure transducer 1071 relays a signal corresponding to the pressure of the CO2 to the PLC 1085. Based on this pressure reading and the aggregate volume of the nozzles 12 in the second fill conduit 27 (a representative schematic of which is shown at FIG. 1b), the PLC 1085 can determine the expected mass flow rate of the CO2 liquid-containing stream, which is empirically determined by a look-up table of pressure versus aggregate volume of the nozzles 12. Having determined mass flow rate, the expected fill time (i.e., predetermined fill time) into the selected second container 26 is calculated by the PLC 1085 as the product of inputted volume of desired CO2 snow block and pre-programmed density of the CO2 snow block to be generated (e.g., preferably 55-60 lb/ft3) divided by the empirically determined mass flow rate.

With the PLC 1085 calculating the predetermined fill time, the PLC 1085 prompts a user message to activate a start button (step 508) to initiate pressurization of the supply manifold 1000 before the filling process. The valving, instrumentation and components of FIG. 7 associated with second fill conduit 27 are configured to be connected with CO2 source supply manifold 1000 and receive CO2 gas and CO2 liquid as will now be explained. Gas conduit 1091 contains pressure transducers 1071 and 1070, and pressure indicator 1078. Pressure transducer 1071 measures the pressure of the headspace in the CO2 source 1090; pressure indicator 1078 measures the pressure of the CO2 gas stream after reduced by pressure reducing valve 1080 ("PRV 1100"); and pressure transducer 1070 measures the pressure of the CO2-liquid containing stream entering the selected second container 26. With CO2 vapor valve 1094 configured in the open position, CO2 control valve 1100 configured in the open position, CO2 liquid withdrawal valve 1093 configured in the closed position, and CO2 control valve 1200 configured in the closed position, CO2 gas is withdrawn from the vapor headspace of CO2 source 1090 and flows into gas conduit 1091. Pressure regulator 1080 ("PRV 1100") reduces the pressure of CO2 gas withdrawn from the CO2 source 1090 from source pressure (e.g., 350-400 psig) to about 150 psig, as measured by pressure indicator 1078. The CO2 gas is preferably added in an amount to prevent the pressure of the liquid-containing CO2 from reducing below a certain pressure (e.g., about 150 psig) to ensure that the liquid does not fall to a pressure that prematurely undergoes a phase change to solid and/or gas within an portion of the conduit of the supply manifold 1000 and second fill conduit 27.

In addition to adequately pressurizing the conduit of manifold 1000, the CO2 gas can optionally be added to flow and purge any residuals and/or impurities for any amount of time. In one example, the purging process can continue for approximately 30 seconds to about 2 minutes. As the CO2 gas flows through the various portions of the gas conduit 1091, any residuals and/or impurities may also be purged. The CO2 gas may be directed into the selected second container 26 by setting valve 1301 open and setting valve 1302 closed. The container 26 at this stage of the filling process does not contain any substantial amount of CO2 snow particulates or CO2 snow block 2. The CO2 gas flows in a downward direction through fill conduit 27 and enters mold cavity 25. The CO2 gas subsequently escapes from container 26 through meshed sheet 31 of second top plate 28 (e.g., withdrawn in a substantially vertically oriented direction as shown in greater detail in FIG. 1*b* by upward arrows).

When the PLC 1085 determines the pressure in the selected fill conduit 27 and the CO2 supply manifold 1000 is at or above a lower pressure sufficient to prevent phase change of the liquid CO2 (e.g., preferably, equal to or higher than 150 psig and more preferably from 200 psig up to about 350 psig), the filling of CO2 snow block 2 into selected container 26 begins (step 509). CO2 vapor valve 1094 can remain in the open position; and control valve 1100 can remain in the open position thereby ensuring adequate gas pressurization within manifold 1000 is present prior to and during liquid CO2 filling into container 26. To begin flow of liquid CO2 from CO2 source 1090, control valve 1302 is set in the closed position to ensure that liquid-containing CO2 does not flow into the first container 10 (i.e., the unselected container as determined by PLC 1085); and control valve 1301 is set in the open position to allow liquid-containing CO2 to flow into the second container 26 (i.e., the selected container as determined by PLC 1085). Referring to FIG. 7, the liquid-containing CO2 from CO2 source 1090 flows along liquid conduit 1092 through control valve 1301 and then is introduced in a downwards direction into second fill conduit 27 of the selected second container 26 (as shown in FIG. 1*b*). Check valve 1067 prevents the pressure of the liquid-containing CO2 from causing the CO2 gas within conduit 1091 to backflow into the CO2 source 1090.

The CO2-containing liquid emerges from the nozzles 12 of second fill conduit 27 to enter selected mold cavity 25 of selected second container 26. In a preferred embodiment, the end of the second fill conduit 27 has four nozzles 12, which are angled to direct or inject the CO2-containing liquid into the selected mold cavity 25 as shown in FIG. 1*b*. A pressure and temperature drop occurs as the liquid-containing CO2 passes through the nozzles 12 and into the selected mold cavity 25 to produce solid particles of CO2 snow and CO2 off-gas therewithin. The CO2 off-gas passes through the meshed sheet 18 of second top plate 28 while the solid particulates are too large to flow across meshed sheet 18 and therefore remain entrapped within mold cavity 25. The particles and gas do not escape along the top edge of container 26, as the periphery of second container 26 is sealed as a result of actuators 30*a* and 30*b* maintaining second top plate 28 sufficiently pressed against the top of mold cavity 25 during the filling. As the CO2 off-gas passes through the meshed sheet 31 as vented gas, it has the desirable effect of packing the solid particles of CO2 snow to form CO2 snow block 2 within the mold cavity 25, thereby beginning the generation of the CO2 snow block 2. The term "packing" as used herein with reference to the automated filling refers to compression of the snow particles into a CO2 snow block 2 of suitable density. The packing can affect the amount of CO2 snow block 2 that can be generated within selected mold cavity 25. In this manner, the present invention has the ability to utilize the formation of the vented gas to improve packing density of the snow particles to form the CO2 snow block 2. The vented CO2 gas flows across the openings of the meshed sheet 31 of second top plate 28, as shown by the arrows in FIG. 1*b*, thereby preventing excess pressure from accumulating within the second mold cavity 25. It should be understood that the gas can be withdrawn at any angle relative to a vertical of the second fill conduit 27, whereby the vertical extends perpendicular to a horizontal surface of the selected mold cavity 25. The vented gas can then be directed into the exhaust conduit 1050 that is operably connected to the second fill conduit 27.

The particles of CO2 snow continue to form within the selected mold cavity 25 in a block-like form. A timer can continue to monitor an elapsed time and generate a corresponding signal for the elapsed time that is transmitted to the PLC 1085. The PLC 1085 continues to allow the CO2-containing liquid to flow along conduit 1092 as long as the elapsed time is less than the predetermined fill time (step 510).

When the PLC 1085 has determined that the elapsed time has reached the predetermined fill time, filling stops. Specifically, PLC 1085 transmits a signal to control valve 1301 to configure it into the closed position, thereby preventing CO2-containing liquid from continuing to flow into selected container 26. Main liquid withdrawal valve 1093 is also closed. The fill process stops (step 511) in this manner. In response to stopping flow of liquid CO2, gaseous CO2 can resume to flow along gas conduit 1091 and into fill conduit 807 and into container, if desired, for a certain duration as a means for purging any impurities or residuals within conduit of manifold 1000 and/or selected container 26. As the CO2 gas flows into the selected container 26 and then vents, the snow block 2 may become more packed.

Shut down of manifold 1000 can also occur as part of step 511. Residual liquid CO2 may be entrapped along the portion of liquid conduit 1092 extending from the control valve 1200 to the main liquid withdrawal valve 1093. Safety relief valves 1086 and 1087 ("SRV 1102" and "SRV 1200") are designed to relieve residual pressure that may be entrapped within gas conduit 1091 and/or liquid conduit 1092. As the trapped liquid CO2 therealong can eventually sublime into CO2 gas, the pressure buildup can be relieved by the safety relief valve 1087, which in one example is set to actuate at 400 psig. The safety relief valve 1086 also serves to relieve pressure if and when the pressure buildup in the CO2 gas 1091 conduit reaches an upper limit (e.g., 400 psig).

Figure 4:
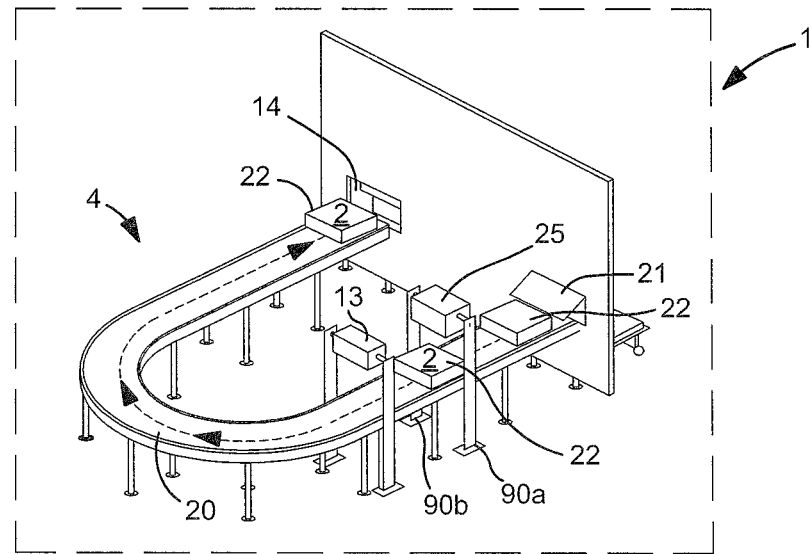
FIG. 4 shows aspects of a conveyor system located within the automatic dispensing station, whereby a box can be fed into the inlet of the conveyor system that is transported below the selected container filled with CO2 snow block and which is tilted into the dispensing orientation to transfer CO2 snow block from the container into the box as part of an automated vending system.
Figure 3:
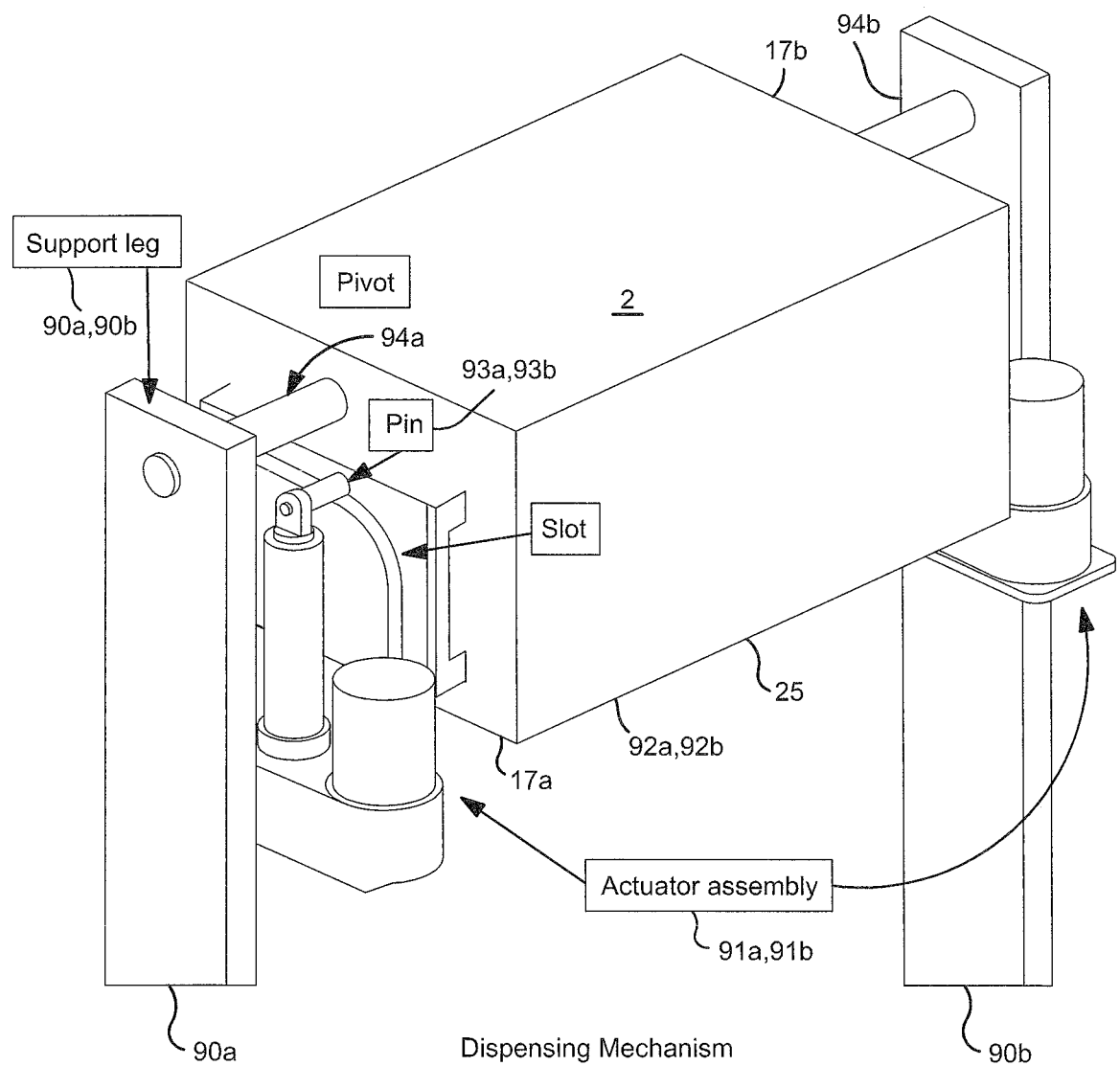
FIG. 3 shows an exemplary actuating mechanism used for dispensing CO2 snow block from one of the containers previously selected for filling and which is located in the automatic dispensing station.
Figure 5:
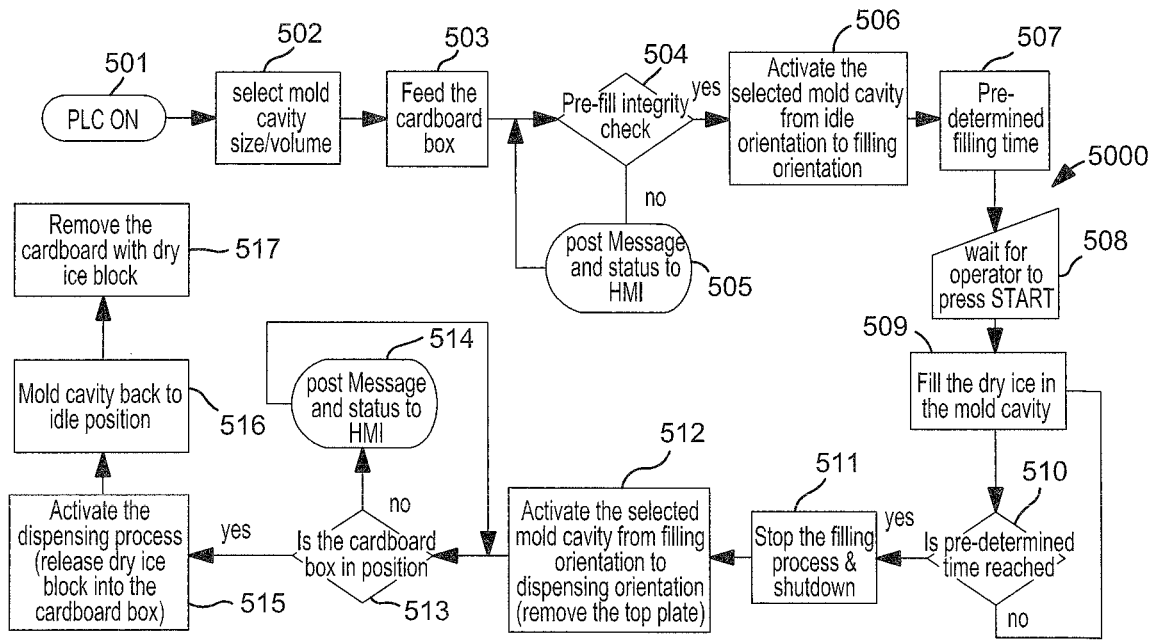
FIG. 5 shows a control methodology utilized to perform the automatic dispensing in accordance with the principles of the present invention.
Figure 9A:
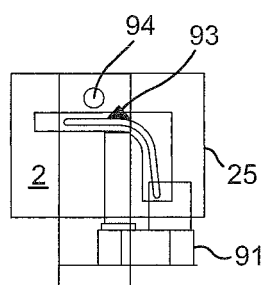
FIG. 9a shows a starting orientation of the selected container ready to dispense CO2 snow block from inside of the container.

Having ended the fill process, the PLC 1085 activates the selected mold cavity 25 from the filling orientation into a dispensing orientation (step 512). First, actuators 30a and 30b are contracted to cause the top plate 28 to be lifted away from the top of mold cavity 25 in a similar manner as show in FIG. 2a. FIG. 3 shows an enlarge view of selected mold cavity 25 containing the desired volume of CO2 snow block 2 with the top plate 28 removed. The mold cavity 25 is ready to dispense CO2 snow block 2 into a box 22, which is conveyed along conveyor belt 20 to a position located below the mold cavity 25 so that it can receive the CO2 snow block 2 as it drops from inside mold cavity 25 into box 22. FIG. 4 shows the movement of box 22 along conveyor belt 20. Specifically, FIG. 4 shows the conveyor system 4 with box 22 moving from the inlet 21 of conveyor window, to a position beneath the mold cavity 25 where it receives the CO2 block 2; and finally to a dispensing window of conveyor system 4 ready for pick-up with the desired CO2 block 2 loaded inside box. When the box 22 is determined to be in the desired position (step 513), the mold cavity 25 is tilted to cause CO2 snow block 2 therein to dispense into the box 22, as will now be described in the sequence of FIGS. 9a, 9b and 9c. FIG. 3 and FIG. 9a show the mold cavity 25 at the start of the dispensing process. FIG. 3 shows that actuator assembly 91a and actuator assembly 91b are operably connected to a first side 17a and second side 17b of selected mold cavity 25, respectively. As used herein, and referring to FIG. 3, a part number followed by "a" is intended to refer to the first side of mold cavity 25 and the same part number followed by "b" is intended to refer to the second side 17b of the mold cavity 25; and the same part number not followed by "a" or "b" is intended to generally refer to the structure associated with mold cavity 25 when mold cavity 25 is not shown in a perspective view (e.g., with reference to FIGS. 9a, 9b and 9c). By way of example, actuator assembly 91a refers to the actuator assembly operably connected to the first side 17a of mold cavity 25 as shown in FIG. 9a; actuator assembly 91b refers to the actuator assembly operably connected to the second side 17b of mold cavity 25; and actuator assembly 91 generally refers to the actuator assembly of mold cavity 25 as shown in cross-sectional views of FIGS. 9a, 9b and 9c. Each of the actuator assemblies 91a and 91b remain engaged to the first side 17a and second side 17b of selected mold cavity 25 through respective pins 93a, 93b which are engaged into respective slots 92a and 92b. The actuator assemblies 91a and 91b cause the mold cavity 25 to rotate when pin 93a, 93b slides along corresponding slots 92a, 92b (as will be explained below). The mold cavity 25 is able to pivot about pivot point 94a and 94b which is connected to support leg structures 90a and 90b. Supporting leg structures 90a and 90b suspend the mold cavity 25 as shown in FIGS. 2a, 2b, 3 and 4. It should be understood that the details of the actuator assemblies as shown in FIG. 3 are omitted from the conveyor system of FIG. 4 and the other figures showing the automatic dispensing station 1 for purposes of clearly describing salient aspects of the present invention in connection with those figures.

Figure 9B:
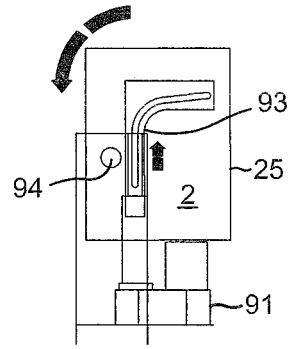
FIG. 9b shows an intermediate orientation created as a result of the selected container rotated 90° counterclockwise relative to the position of FIG. 9a as a result of the actuator assembly exerting an upward force along the sides of the container.
Figure 9C:
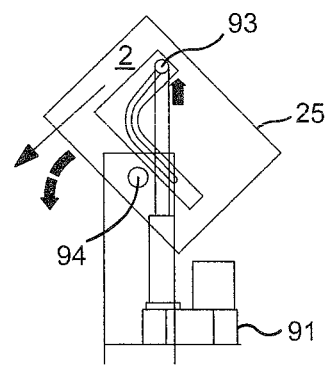
FIG. 9c shows a final titled orientation of the selected container rotated an additional 45° counterclockwise relative to the position of FIG. 9b in which the CO2 snow block can be released from inside of container into a box located beneath the selected container.

Starting from the orientation of FIG. 3 and FIG. 9a, the actuator assembly 91a and actuator assembly 91b are each activated (e.g., programmed by PLC 1085) to exert an upward force which is transmitted to each of pins 93a, 93b on first side 17a and second 17b of mold cavity 25, respectively. The pins 93a, 93b are restricted from moving upwards within slots 92a, 92b. As a result, the pins 93a, 93b, each of which is spaced the same distance away from the pivot 94a, 94b, exert a torque that causes mold cavity 25 to rotate counterclockwise. As the mold cavity 25 rotates counterclockwise, the slots 92a, 92b become vertically oriented thereby allowing the respective arms of the actuator assemblies 91a, 91b to extend upwards along slots 92a, 92b. FIG. 9b shows an intermediate configuration of the rotated mold cavity 25 having rotated 90 degrees counterclockwise about pivot 94a, 94b in which arms of actuator assemblies 91a, 91b have partially expanded upwards into and along slots 92a, 92b. The arms of the actuator assemblies 91a, 91b continue to exert an upward force through their respective pins 93a, 93b to create additional counterclockwise rotation of mold cavity 25 until the arms and respective pins 93a, 93b have travelled to the upper most edge of slots 92a, 92b as shown in FIG. 9c. FIG. 9c represents an additional 45° counterclockwise rotation relative to FIG. 9b. The tilted orientation of FIG. 9c can allow the CO2 snow block 2 to be released from inside of mold cavity 25 into box 22 (step 515), which at this juncture is positioned below mold cavity 25 as shown in FIG. 4. FIG. 4 shows mold cavity 25 inverted to indicate that CO2 snow block 2 has been released into box 22. The designation "2" within box 22 is intended to signify that the box 22 contains CO2 snow block 2.

With CO2 snow block 2 released from mold cavity 25 and dispensed into box 22, the actuator arms are retracted, causing the pins 93a, 93b and arms attached thereto to travel downwards along slots 92a, 92b to be reconfigured into the orientation of FIG. 9a, which at this stage, represents the idle orientation of mold cavity 25 (step 516). Box 22 with CO2 snow block 2 therein is conveyed along conveyor belt 20 to the outlet/dispensing window 14 of conveyor system 4 ready for pick-up (step 517).

While the automated filling into an automatic dispensing station 1 has been performed based on a predetermined fill time, the automated fill can also occur based on other criteria. For example, the PLC 1085 can use another set point for filling, including, by way of example, a pre-defined weight of the CO2 snow block 2; a pressure in the selected mold cavity; a capacitance of the CO2 snow block 2; a temperature in the container; or a deformation of a top plate of the selected mold cavity.

Figure 6:
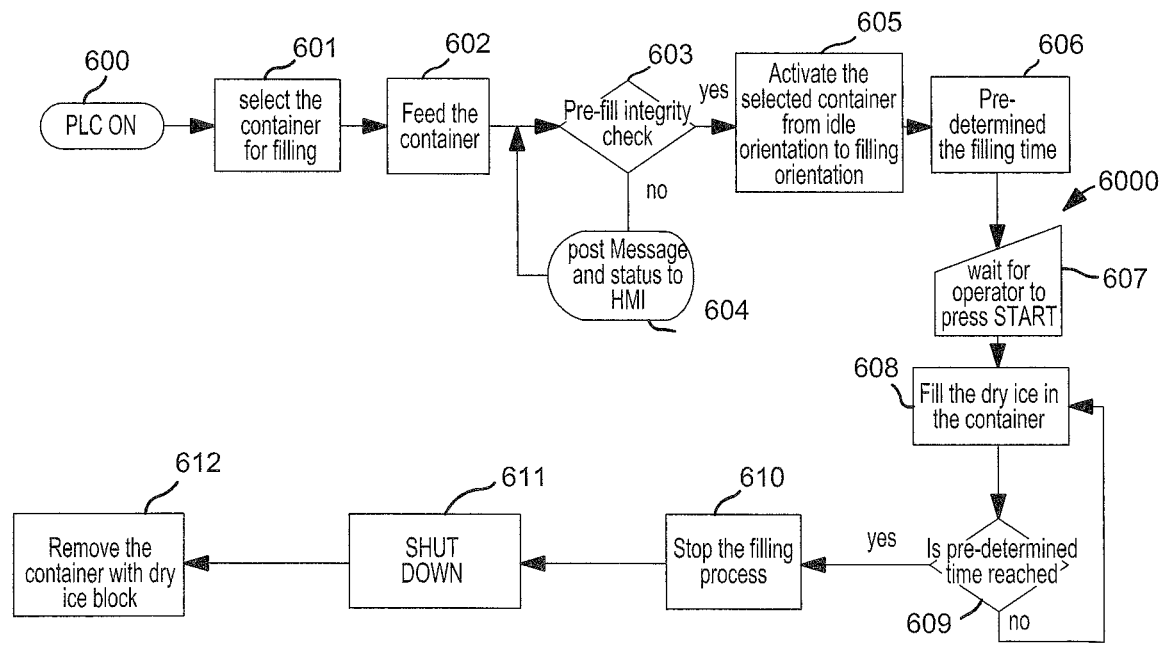
FIG. 6 shows a control methodology utilized to perform an automatic charging operation into a single container that is loaded within a charging station of FIG. 8.
Figure 8:
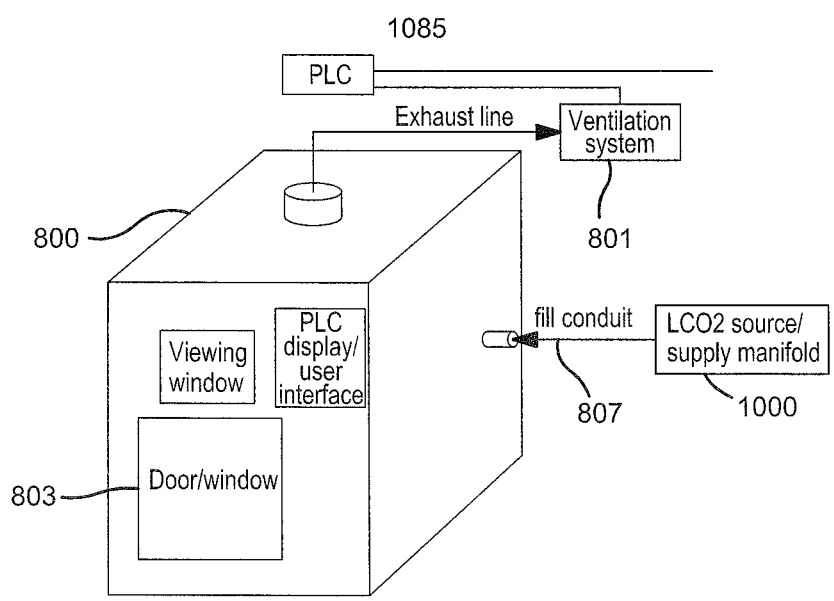
FIG. 8 shows a charging station into which a container can be loaded for automatically charging CO2 snow block.

In another embodiment, as an alternative to using an automatic dispensing station 1, a method of automatically charging CO2 snow block into a single container within a charging station can be carried out. FIG. 6 shows the associated control methodology 6000, and FIG. 8 shows an exemplary charging station 800. The inlet of the charging station 800 is connected to the CO2 supply manifold 1000 and the outlet of the charging station 800 is connected to ventilation system 801. The CO2 supply manifold 1000 is substantially identical with the exception that the automatic dispensing station 1 is now replaced with the charging station of FIG. 8. PLC 1085 is in electrical communication with charging station 800, CO2 supply manifold 1000, ventilation system 801 and associated components thereof. Having activated PLC 1085 (step 600), a container is selected for filling (step 601). The container may be any suitable box into which CO2 snow block can be charged. The container is placed within the charging station 800 (step 602). As described hereinbefore, pre-fill integrity checks (step 603) are performed by PLC 1085. As an additional pre-fill integrity check, a door sensor determines if door 803 is locked. Failure to satisfy any of the pre-fill integrity checks will prompt PLC 1085 to generate an appropriate HMI message for the user to take appropriate action (step 604).

When all pre-fill integrity checks are completed, the container is activated from the idle orientation into the filling orientation (step 605). By way of example and not intending to be limit, the fill orientation can include configuring a top plate onto the top of container by one or more vertical actuators which are placed onto the top of container to create a seal along the periphery. It should be understood that the container need not utilize a top plate and mold cavity as described with reference to FIGS. 1a, 1b, 2a and 2b. Accordingly, if a top plate and mold cavity as described hereinbefore is not needed, the fill orientation can include introducing and orienting a suitable charger which is operably connected to the fill conduit and top of container. The filling orientation also provides safety interlocks that are provided in the charging station 800 so that the door 803 remains locked during CO2 charging, and the container is loaded in a secure manner within interior of the charging station 800.

When the container is validated to be in a fill orientation, user can input the desired volume of CO2 snow block 2 desired to be generated within the container. At step 606, the PLC 1085 determines a predetermined fill time as described hereinbefore with respect to step 507 in the example of FIG. 5. The density of the CO2 snow block (e.g., 55-60 lb/ft3) is pre-programmed into the PLC 1085; and the mass flow rate empirically determined from a look-up table of CO2 pressure versus aggregate volume of nozzles in the charger.

A user activates a start button (step 607) to initiate the automated charge process. Filling begins as follows (step 608). A sufficient amount of gaseous CO2 from the supply manifold 1000 is introduced from the vapor headspace of CO2 source 1090 into fill conduit 807, which extends between the supply manifold 1000 and the container. The supply manifold 1000 is operably connected to the fill conduit 807. CO2 gas is added into the conduit to pressurize the conduits of manifold 1000 to a level that is sufficient to prevent the pressure of the liquid CO2 from reducing below a certain pressure (e.g., below about 150 psig) at which the liquid CO2 can prematurely undergo a phase change to solid and/or gas within the conduit of manifold 1000 and fill conduit 807. The PLC 1085 continues to monitor pressure in the supply manifold 1000 from pressure transducer 1070 (FIG. 7), which measures the pressure of CO2 and the fill conduit 807. When the pressure is determined to be at or above a certain pressure such that liquid CO2 does not change phase, the PLC 1085 transmits a signal to a control valve 1200 to configure it into the open position. With the control valve 1200 in the open position, liquid CO2 from CO2 supply 1090 is withdrawn and flows along conduit 1092. The pressure of the liquid CO2 is higher than that of the gaseous CO2 occupying the manifold 1000; as a result, gas flow of CO2 into the container stops as liquid CO2 flows into the container of charging station 800 along a first direction (e.g., substantially vertical and downwards into container). As the CO2 liquid enters container, it undergoes a phase change to transform into CO2 snow block and off-gas. The off-gas escapes container and vents through exhaust conduit 1050. CO2 liquid continues to enter container until the PLC 1085 determines that the elapsed fill time has reached the predetermined time. When the elapsed time has reached the predetermined time, PLC 1085 relays a signal to control valve 1200 to configure it into the closed position, thereby stopping withdrawal of liquid CO2 from the CO2 source 1090 (step 610). Main liquid withdrawal valve 1093 is also closed. In response to stopping flow of liquid CO2, gaseous CO2 can resume to flow along gas conduit 1091 and into fill conduit 807 and into container, if desired, for a certain duration as a means for purging any impurities or residuals within conduit of manifold 1000 and/or container. As the CO2 gas flows into the container and then vents into exhaust conduit 1050, the snow block may become more packed. It should be understood that while valve 1093 and valve 1094 are shown as manual valves in FIG. 7, automatic control valves can be used in place of each of the manual valves 1093 and 1094.

Shut down can now be performed (step 611). Residual liquid CO2 may be entrapped along the portion of liquid conduit 1092 extending from the control valve 1200 to the main liquid withdrawal valve 1093. Safety relief valves 1086 and 1087 ("SRV 1102" and "SRV 1200") are designed to relieve residual pressure that may be entrapped within gas conduit 1091 and/or liquid conduit 1092 when various system components of charging station 800 and manifold 1000 are shut down. As the trapped liquid CO2 therealong can eventually sublime into CO2 gas, the pressure buildup can be relieved by the safety relief valve 1087, which in one example is set to actuate at 400 psig. The safety relief valve 1086 also serves to relieve pressure if and when the pressure buildup in the CO2 gas 1091 conduit reaches an upper limit (e.g., 400 psig).

After shutdown has been completed at step 611, the PLC 1085 deactivates the safety interlocks of charging station 800 so that door 803 of charging station can be opened to access container and remove container with the CO2 snow block 2 filled therein.

It should be understood that the automated charging into a container can also occur based on other criteria. For example, the PLC 1085 can use another set point for filling, including, by way of example, a pre-defined weight of the CO2 snow block 2; a pressure in the container; a capacitance of the CO2 snow block 2; a temperature in the container; or a deformation of a top plate which may be utilized to seal the container.

While the container with CO2 snow block 2 as has been described can be used with any "item" as defined herein below, in a preferred embodiment, the present invention is especially conducive for maintaining compliance with the packaging protocols required to reproducibly preserve biological samples, thereby avoiding sample degradation and allowing the samples to revert back to its functional state and be subject to applicable testing upon arrival to its destination site. Further, the CO2 snow block 2 is preferably generated with improved packing density that can hold the requisite temperature of the container with extended cooling effect duration in comparison to standard dry ice shipping containers containing CO2 dry ice produced by conventional techniques. The extended cooling effect duration can reduce the risk of sample degradation in transport and allow the user more flexibility to optimize cost and convenience regarding preparation and assembly of transportable containers of the present invention; when items (including samples, such as biological samples) are acquired; and the types of shipping methods that can be utilized.

Numerous modifications to the present invention are contemplated without departing from the spirit of the present invention. For example, the sequence of steps in the control methodology for the automated filling station (FIG. 5) can be altered such that box 22 is positioned in place after pre-fill integrity checks pass. With respect to the charging station (FIG. 6), the PLC can be activated after the container is loaded into charging station. Additionally, the injection direction of CO2 streams into the selected container can be varied. For instance, the CO2-containing liquid may be injected upwards; or laterally; or downward at various angle orientations, with the exact angle determined by the nozzle shape, design, and geometry in the fill conduit. Similarly, the CO2 gas and off gas within selected container can be varied so as to vent in a downward direction or a lateral direction or an upward and angled direction. Additionally, with respect to the automated charging station, the control methodology can be modified so that the user inputs the volume of snow block 2 and selects the container which is listed on the HMI of the automatic dispensing station 1.

Figure 10:
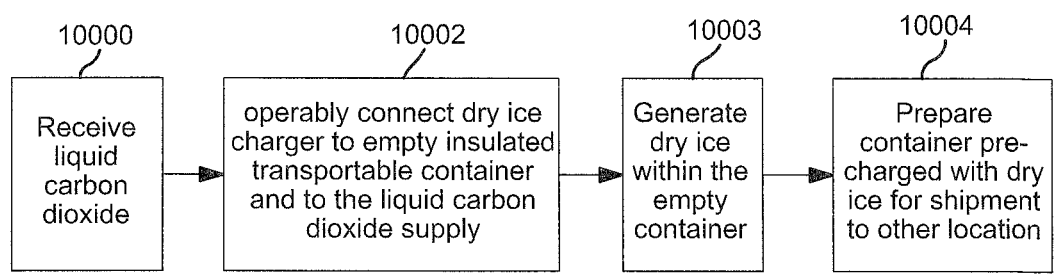
FIG. 10 illustrates a representative flow diagram for pre-charging CO2 snow in accordance with the principles of the present invention.

The automated charging method described herein can be implemented as part of a method for pre-charging an empty or partially empty container with CO2 snow or CO2 snow block to create a pre-charged container. In one example, the charging station 800 of FIG. 8 is used to create multiple pre-charged containers with CO2 snow on a batch, continuous or semi-continuous basis for shipment to other locations, such as a clinical site. The charging station 800 maintains an inventory of containers and CO2 supply. FIG. 10 shows a representative schematic of the sequence of steps the charging station 800 undergoes. Step 10000 requires the charging station to receive a source of CO2 supply. Preferably, the CO2 supply is CO2 supply 1090 which can be connected to the gas supply manifold 1000. Step 10002 requires that the CO2 supply manifold 1000 is operably connected to the charging station 800 (FIG. 8); and container is loaded into charging station 800. Any type of charging system may be utilized. For example, the charging system of Serial application Ser. No. 15/645,152, the details of which are incorporated herein by reference in its entirety for all purposes, may be operably connected between a CO2 supply 1090 and the inlet of a container loaded into charging station 800.

Step 10003 illustrates generation of CO2 snow within the container. The control methodology of 6000 of FIG. 6 can be used to generate the CO2 snow within the container. After creating the pre-charged container, step 10004 shows that the pre-charged container is prepared for delivery to the second location. Preparation may include one or more steps. For example, the pre-charged container can be sealed (e.g., by a top cover) with a passageway through which the CO2 off-gas can escape, thereby substantially reducing or eliminating pressure buildup of CO2 gas that is formed during storage, preservation and/or transport of items in the container. Additionally, instructions for return shipment as well as instructions of use can be provided as part of the step for preparing the pre-charged container for delivery. Certain criteria can be utilized to determine whether a substantially depleted or partially depleted container should be returned to the charging location or, alternatively, used for another shipment of perishable items. For example, and not intending to be limiting, the amount of CO2 snow remaining in the pre-charged container; the type of perishable items loaded into the container; the duration of shipment; and/or the required temperature the perishable item must not exceed for a certain time during delivery, may determine that the pre-charged container needs to be re-charged at the first location (e.g., charging location) to replenish the container with CO2 snow. Alternatively, the pre-charged container may be reusable in its partially depleted form without the need to re-fill CO2 snow by delivery to an intermediate location, thereby allowing an additional perishable item to be loaded into the partially depleted container for transport. The extended cooling effect duration of the pre-charged containers can reduce the risk of sample degradation in transport and allow more flexibility to optimize cost and convenience regarding the types of shipping methods.

Still further, preparation of the pre-charged container includes providing a label that may be affixed to the exterior of the pre-charged container, which includes shipping information of the second location. The pre-charged container may be placed into a secondary container so as to require affixing the shipping label onto the exterior of the secondary container. Additionally, if the specific type of perishable item is considered hazardous in accordance with certain regulations (e.g., Department of Transportation), the labeling may need to identify such perishable contents as hazardous and may require customized packaging to ensure the perishable items are suitably confined within the pre-charged container and any optional secondary container or packaging required for the pre-charged container to be inserted into.

Having prepared the pre-charged container for delivery, the pre-charged container may be delivered to a second location via a designated receiver or commercial carrier for ground or air delivery. Alternatively, the person or entity responsible for creating the pre-charged container at the charging location may itself deliver the pre-charged container to the second location. In one example, the second location is a clinical site such as a hospital, pharmaceutical company, university or physician office or any other person or entity loading one or more perishable items into the pre-charged container. When the second location receives the pre-charged container, the user at the second location accesses the pre-charged container by removing, detaching or opening a cover or other closure mechanism. The interior of the pre-charged container in this manner can be accessed. The second location may have an inventory of certain perishable items which require delivery to an end user. The user at the second location places one or more of the perishable items directly or indirectly into the pre-charged container so that at least a portion of the one or more perishable items is located in sufficient proximity to the CO2 snow to maintain its temperature below an upper limit. The perishable item is preferably placed in a product holder prior to loading into the pre-charged container. Instructions for return delivery may also be provided by the second location. For example, the second location may provide instructions to a final user for return shipment of the pre-charged container when the CO2 snow in the pre-charged container has been substantially depleted to a point where the temperature of the perishable item during delivery can no longer be maintained below an upper limit. The pre-charged container is re-sealed at the second location after loading the perishable item. Delivery to a third location can occur by a designated receiver or commercial carrier, or by the person or entity performing the loading of perishable item into the pre-charged container at the second location.

The third location is preferably an end user who opens the pre-charged container and accesses the interior of the pre-charged container to remove the perishable item for testing, use or storage. The third location may perform the testing or have testing conducted on its behalf. In one example, the third location is a contract research organization or a pharmaceutical company. The perishable item can be a biological sample, which has not degraded and be subject to applicable testing or use at the third location. The user at the third location may determine whether the $CO_2$ snow has sublimed to an extent that the pre-charged container is substantially depleted so that it can no longer preserve the perishable items at the third location or during an additional delivery. Depending on various criteria, including, by way of example, the level of depletion of $CO_2$ snow, along with the type of perishable item to be preserved and the desired duration for which the perishable items need to remain in the container, the user at the third location may notify a supply location (e.g., the first location or other charging location) that the pre-charged container is depleted. The pre-charged container in its substantially depleted state is returned to a charging location for possible replenishment if determined upon inspection to be reusable. Alternatively, the pre-charged container in its partially depleted state may be returned to an intermediate location where new perishable items can be loaded into the container for additional use without replenishment of $CO_2$ snow. It should be understood that the third location need not notify a specific location before returning a container. For example, the third location can send the container to a supply location or an intermediate location without notification. The third location can generate a return shipping label and/or utilize an existing return shipping label to send to the desired location. Additionally, the third location need not inspect the container for re-usability. The third location can subsequently deliver the container to any number of sites that support the supply chain. The container need not be returned to the same intermediate location (e.g., the second location) where perishable items can be loaded or removed; or to the first location where the $CO_2$ snow can be charged. For example, the third location may leave perishable items inside the container or add additional perishable items to the container before sending the container to an additional site for testing, use, or storage.

The following example illustrates a preferred embodiment of the present invention for pre-charging containers to be loaded when the perishable items to be loaded therein are biological samples. Company ABC has a charging station and an inventory of containers and $CO_2$ supply sources. Company ABC creates multiple containers pre-charged with $CO_2$ snow as described hereinbefore. Company ABC prepares multiple pre-charged containers for delivery to Company LMN. Company ABC has a 14 ton liquid $CO_2$ storage tank located outside its facility. The liquid $CO_2$ storage tank is connected to a dry ice charging system inside the facility using insulated piping. The dry ice charging system is also connected to an empty, cylindrically-shaped, vacuum-insulated aluminum container with exterior dimensions of approximately 20 inches high by 12 inches diameter and approximately 10 Liters of internal volume. Company ABC activates the dry ice charging system to flow liquid $CO_2$ from the $CO_2$ supply source into the container. Approximately 10 pounds of $CO_2$ snow can be formed inside the container in less than 10 minutes. This quantity of $CO_2$ snow maintains the internal container temperature in the target zone below $-70°$ C. for 20 days. Company ABC places the container pre-charged with $CO_2$ snow into a secondary container, such as a cardboard box. Company ABC labels the cardboard box for ground shipping to be picked-up by a commercial carrier for delivery to Company LMN; and includes the intended address of Company LMN at the second location. The pre-charged container can be sealed (e.g., by a top cover that is mechanically attached to the container) with a passageway through which the $CO_2$ off-gas can escape, thereby substantially reducing or eliminating pressure buildup of $CO_2$ off-gas that is formed during storage, preservation and transport of biological samples in the container. Instructions of use and instructions for return delivery may be provided by Company ABC as part of the pre-charged container.

The pre-charged containers are shipped to Company LMN, which, in this example, is a clinical site. Company LMN receives the pre-charged containers with 15 or more days of $CO_2$ snow remaining within each of the pre-charged containers. Upon receipt of the pre-charged containers, Company LMN opens the pre-charged containers and then places one or more vials into each pre-charged container so that it is at least partially embedded within the $CO_2$ snow or surrounded by the $CO_2$ snow. Alternatively, the one or more vials may be arranged to be in contact with the $CO_2$ snow so as to be positioned on top of the $CO_2$ snow or embedded, partially of fully, therewithin. Additionally, the $CO_2$ snow may be in close proximity to the one or more vials within the container. The one or more vials are stored at Company LMN in an ultra-low temperature freezer at $-70°$ C. Each vial contains a cell suspension. In one example, Company LMN loads a total of fifty (50) 2 milliliter vials with each vial containing 1.5 milliliter of the cell suspension. To preserve optimum cell quality, the vials are prepared for delivery so as to maintain a temperature below $-70°$ C. during the entire duration of shipment to the intended recipient at a third location. No additional $CO_2$ snow or other refrigerant is required to be added to maintain such temperature.

Company LMN loads a total of the 50 vials into the pre-charged containers and directly or indirectly sends the pre-charged containers to Company XYZ located at the third location using ground shipping or other modes of commercial delivery. Upon receipt of the pre-charged containers with samples therein, Company XYZ opens the pre-charged containers to access the vials for testing of the cell suspensions. The pre-charged containers can be returned by Company XYZ to Company LMN or another intermediate location for loading of more vials if sufficient cooling capacity exists. Otherwise, the pre-charged containers are considered substantially depleted and can be returned to Company ABC or another charging location for inspection to determine whether they are re-usable. If determined to be re-usable, the charging location (e.g., Company ABC) can pre-charge the substantially depleted containers to create replenished, pre-charged containers filled with the $CO_2$ snow containers that can now be re-sent to Company LMN or another intermediate location for sample loading and Company XYZ or another user location for sample testing.

The inspection preferably involves testing the sublimation rate to ensure the container can continue to provide sufficient refrigeration for the requisite duration. A typical inspection procedure consists of (1) introducing a measured weight of $CO_2$ snow into the container; (2) measuring the weight of the remaining $CO_2$ snow as it sublimates over a given amount of time; and (3) calculating the sublimation rate to be the weight of the $CO_2$ snow sublimated divided by the amount of time over which the weight of the $CO_2$ snow in the container is lost. In this manner, by having knowledge of the sublimation rate and the $CO_2$ snow capacity of the container, the number of days that a fully charged container can supply is known. In a similar manner, the remaining duration of a partially depleted container or substantially depleted container can be determined.

Variations to FIG. 10 are contemplated. For example, the CO2 snow can be created outside the container and then loaded into the interior of the container. For example, the automatic dispensing station 1 can be utilized to create and vend the pre-charged containers, which are then shipped to a second location for loading of perishable items therein. Alternatively, several locations may receive the pre-charged containers. Still further, the automated control methodology of the present invention can be applied to any container and/or charging system. For example, the automated control methodology described herein can be used in connection with a container or charging system as described in Serial application Ser. No. 15/645,152, the details of which are incorporated herein by reference in its entirety for all purposes. Specifically, the container can be utilized as part of the automatic fill dispensing station 1 or charging system 800 for carrying out the pre-charging methods (FIG. 10) of the present invention. Still, further, the sequence of steps in FIG. 10 may be performed using any suitable container or charging system on a manual basis, including those described in Serial application Ser. No. 15/645,152. For example, CO2 snow or CO2 snow block can be manually transferred from a CO2 source into an empty or partially empty container to create the pre-charged CO2 container that can be subsequently delivered to another location. Additionally, it should be understood that the pre-charging methods as described herein can be utilized in connection with CO2 snow block, CO2 snow and liquid CO2.

In another variation to FIG. 10, the pre-charged container may be utilized for multiple shipping events following a single pre-charging at the first location. For example, the pre-charged container may be created at a first location and then delivered to a second location where the pre-charged container is loaded with a first perishable item ("Material 1"). The pre-charged container with Material 1 is then delivered to a third location where Material 1 is removed. The pre-charged container still possesses sufficient cooling duration and therefore is returned to the second location where a second perishable item ("Material 2") is loaded into the pre-charged container. The pre-charged container with Material 2 loaded therein is delivered to the third location or a new fourth location where Material 2 is removed. At this point, the pre-charged container is considered substantially depleted (i.e., no longer exhibits sufficient cooling duration) and therefore is returned to the first location where the container is inspected to determine whether reusable. If determined to be reusable by the person or entity at the first location, the person or entity at the first location performs another pre-charge of CO2 snow to replenish the cooling duration of the pre-charged container, which is ready for subsequent shipments in the manner described hereinbefore. It should be noted in this example that the CO2 snow need not be fully sublimed prior to the need for a subsequent pre-charging of CO2 snow into the container by the first location. In this manner, greater utilization of the cooling duration can be realized.

The flow of pre-charged containers in its various states (e.g., substantially depleted, partially depleted, perishable item loaded therein or removed therefrom) can occur in numerous ways. For example, the pre-charged container loaded with the perishable material at the second location does not need to be sent from the second location to a new third location but could instead be sent from the second location to the first location where the container was pre-charged with CO2 snow. For example, a depleted or partially depleted pre-charged container can be returned by any number of the locations involved in preparing or delivering the pre-charged containers or using and/or testing the perishable items therein. For example, the location, person or entity initiating return of the substantially depleted or partially depleted pre-charged container may also be the same location, person or entity to load the perishable item into the pre-charged container (e.g., the second location) after creation of the pre-charged container upstream by the first location. In another example, the location, person or entity initiating return of the substantially depleted or partially depleted pre-charged container may be the same location, person or entity that accesses the pre-charged container to remove the perishable item therein at the final use destination after creation of the pre-charged container at the first location. In yet another example, the substantially depleted or partially depleted pre-charged container may be requested for return by the same location, person or entity that is creating the pre-charged container (e.g., the first location). The actual act of transporting the pre-charged container in a substantially depleted or partially depleted form after the perishable litem has been removed therefrom from the use location to the location where it will be exchanged can be performed by the pre-charging location (e.g., the first location); the loader of the perishable items (e.g., the second location); or the final user of the perishable item (e.g., final destination or third location); or any designated receiver or commercial carrier for ground or air delivery. Preferably, the actual act of exchanging a partially depleted or substantially depleted pre-charged container for a replenished or new pre-charged container filled with CO2 snow is performed by the first location that performs the pre-charging operations. It should be understood that more than one location might perform pre-charging operations on behalf of a given loader of perishable items or final user of the perishable items. It should be further understood that maintenance or repair of the substantially depleted or partially depleted container can be performed prior to performing a subsequent pre-charging operation at the first location thereby by ensuring adequate performance of the fleet of the pre-charged containers.

The present invention with regards to pre-charging is advantageous over conventional dry ice containers. The present invention offers ease of use across the entire supply chain; reproducibility of the amount of CO2 snow charged into containers; and a longer duration fleet of containers. The pre-charged containers prepared, delivered, and returned according to the principles of the present invention generally retain about 10-15 or more days of CO2 snow remaining within each of the pre-charged containers, as opposed to five days or less with typical CO2 containers. The longer duration of CO2 snow within the pre-charged container allows the flexibility to utilize lower cost shipment (e.g., ground shipment) to the second location (e.g., clinical site such as a hospital, university or physician office or any other person or entity loading the perishable item into the pre-charged container) as opposed to next day or air shipment used for conventional containers. The second location has ample time to load the perishable item into the pre-charged container without the need to replenish the pre-charged container with more CO2 snow. Accordingly, lower cost (e.g., ground shipment) can be employed not only for shipment from the charging location to the second location, but also from the second location to the final user without risk of a substantial amount of the CO2 snow subliming. The on-demand generation of CO2 snow of the present invention eliminates the need and associated challenges for an intermediate user or final user to procure, maintain inventory and handle CO2 snow.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method of pre-charging an empty or partially empty insulated container with CO2 snow to create a pre-charged container at a first location for transport to a second location, comprising the steps of:
   receiving a liquid CO2 source at the first location;
   operably connecting a CO2 snow charger to the empty or the partially empty container and to the liquid CO2 source at the first location;
   generating the CO2 snow within the empty or the partially empty container to create the pre-charged container at the first location, without loading one or more perishable items;
   preparing the pre-charged container for delivery to the second location.

2. The method of claim 1, wherein the step of preparing the pre-charged container for delivery to the second location, further comprises:
   sealing the pre-charged container;
   packaging the pre-charged container; and
   providing the pre-charged container to a designated receiver or commercial carrier for ground or air delivery to the second location.

3. The method of claim 1, wherein the step of preparing the pre-charged container further comprises including a label with the pre-charged container, said label including shipping information of the second location.

4. The method of claim 3, wherein the second location is a clinical site.

5. The method of claim 1, wherein the step of preparing the pre-charged container includes packaging the pre-charged container with instructions to a final user for return of the pre-charged container.

6. The method of claim 1, further comprising the step of:
   receiving an at least partially depleted container from the second location or other previous use location;
   inspecting the at least partially depleted container, and in response thereto,
   generating CO2 snow in the at least partially depleted container to create a replenished, pre-charged container;
   preparing said replenished, pre-charged container for delivery to the second location, the previous use location or another location.

7. The method of claim 1, wherein the step of creating the pre-charged container is characterized by an absence of loading a perishable item therein.

8. The method of claim 1, further comprising:
   the first location receiving notification from the second location or a third location that the pre-charged container with the CO2 snow is partially or substantially depleted so as to create a partially or substantially depleted container.

9. The method of claim 8, further comprising coordinating for return delivery of the substantially depleted container.

10. The method of claim 8, creating a second pre-charged container filled with CO2 snow pre-charged therein.

11. The method of claim 1, wherein the generating of the CO2 snow occurs in an automatic dispensing station or an automatic charging station.

12. The method of claim 1, further comprising:
    the first location receiving an at least partially depleted container without perishable item therein, said depleted container defined as the pre-charged container with CO2 snow therein whereby said CO2 snow has at least partially sublimed;
    inspecting the at least partially depleted container;
    determining the at least partially depleted container is re-usable;
    filling the at least partially depleted container with CO2 snow to create a replenished and pre-charged container with the CO2 snow;
    preparing the replenished and pre-charged container for delivery.

13. A method of supplying a perishable item to a location, comprising the steps, of:
    receiving a pre-charged container at least partially filled with CO2 snow inside the pre-charged container without one or more perishable items loaded therein;
    opening the pre-charged container at least partially filled with the CO2 snow;
    accessing an interior region of the pre-charged container at least partially filled with the CO2 snow;
    loading the perishable item into the pre-charged container at least partially filled with the CO2 snow, wherein the perishable item is in sufficient proximity to the CO2 snow to maintain a temperature of the perishable item below an upper limit;
    sealing the pre-charged container at least partially filled with the CO2 snow;
    preparing the pre-charged container at least partially filled with the CO2 snow with the perishable item therein for delivery to the location.

14. The method of claim 13, wherein the step of preparing the pre-charged container with the perishable item therein for delivery further comprises the step of identifying the perishable item as a hazardous material.

15. The method of claim 13, further comprising:
    receiving a partially depleted container from the location;
    accessing an interior of the partially depleted container; and
    loading a second perishable item into the partially depleted container without introducing additional CO2 snow into the partially depleted container.

16. The method of claim 13, further comprising placing the perishable item into a product holder followed by at least partially positioning the product holder with the perishable item therein in sufficient proximity to the CO2 snow to maintain the temperature of the perishable item below an upper limit.

17. The method of claim 16, wherein the temperature of the product holder is maintained below −70 degrees Celsius while in delivery to the final location.

18. The method of claim 13, further comprising providing instructions to a final user for return delivery of the pre-charged container.

19. The method of claim 13, wherein the step of preparing the pre-charged container with the perishable item loaded therein comprises configuring the pre-charged container ready for pick-up by a designated receiver or commercial carrier.

20. A method of delivering at least a partially depleted CO2 snow pre-charged container, comprising:
   receiving the at least partially depleted CO2 snow pre-charged container from a loading location where one or more perishable items have been loaded into the pre-charged container, said at least partially depleted CO2 snow pre-charged container further comprising one or more perishable items in sufficient proximity to the CO2 snow to maintain the temperature of the perishable item below an upper limit;
   opening the at least partially depleted CO2 snow pre-charged container to access the interior of the pre-charged container;
   removing the one or more perishable items from the at least partially depleted CO2 snow pre-charged container; and
   delivering the at least partially depleted CO2 snow pre-charged container to a location for charging, loading additional perishable items or using at least a portion of the one or more perishable items remaining in the at least partially depleted container CO2 snow pre-charged container.

21. The method of claim 20, further comprising:
   notifying a supply location that the at least the partially depleted CO2 snow pre-charged container is substantially depleted;
   returning the at least partially depleted CO2 snow pre-charged container to the supply location and, in response thereto, either receiving from the supply location (i) the at least partially depleted CO2 snow pre-charged container replenished and filled with CO2 snow and comprising the one or more perishable items; or (ii) a new pre-charged container filled with CO2 snow and comprising the one or more perishable items.

22. A method of creating a pre-charged container with CO2 snow at a first location for transport to a second location, comprising the steps of:
   introducing the CO2 snow into an empty or partially empty container at the first location from a source of CO2 snow at the first location, without loading of one or more perishable items;
   creating the pre-charged container at the first location; and
   preparing the pre-charged container for delivery from the first location to the second location.

23. The method of claim 22, wherein the step of preparing the pre-charged container for delivery to the second location, further comprises:
   sealing the pre-charged container; and
   packaging the pre-charged container.

24. The method of claim 22, further comprising the step of providing the pre-charged container to a designated receiver or commercial carrier for ground or air delivery to the second location.

25. The method of claim 22, wherein the step of preparing the pre-charged container further comprises including shipping information.

26. The method of claim 22, wherein the step of preparing the pre-charged container includes packaging the pre-charged container with instructions to a final user for return of an at least partially depleted, pre-charged container.

27. The method of claim 22, further comprising:
   receiving an at least partially depleted container from the second location or other previous use location;
   inspecting the at least partially depleted container, and in response thereto,
   introducing CO2 snow in the at least partially depleted container to create a replenished, pre-charged container;
   preparing said replenished, pre-charged container for delivery to the second location, the previous use location or another location.

28. The method of claim 22, further comprising:
   the first location receiving notification from the second location or a third location that the pre-charged container with the CO2 snow is at least partially depleted or substantially depleted.

29. The method of claim 22, further comprising the first location coordinating for return delivery of the pre-charged container with the CO2 snow that is at least partially depleted or substantially depleted.

30. The method of claim 22, creating a second pre-charged container filled with CO2 snow pre-charged therein at the first location.

31. The method of claim 22, wherein the step of introducing the CO2 snow occurs manually or automatically.

32. The method of claim 22, further comprising:
   the first location receiving an at least partially depleted container without perishable item therein, said at least partially depleted container defined as the pre-charged container with CO2 snow therein whereby said CO2 snow has at least partially sublimed;
   inspecting the at least partially depleted container;
   determining the at least partially depleted container is re-usable;
   introducing into the at least partially depleted container CO2 snow to create a replenished and pre-charged container with the CO2 snow; and
   preparing the replenished and pre-charged container for delivery.

33. A method of creating a pre-charged container with CO2 snow at a first location for transport to a second location, comprising the steps of:
   introducing the CO2 snow into an empty or partially empty container at the first location from a source of CO2 snow at the first location;
   creating the pre-charged container at the first location; and
   preparing the pre-charged container for delivery from the first location to the second location;
   receiving an at least partially depleted container from the second location or other previous use location;
   inspecting the at least partially depleted container, and in response thereto,
   introducing CO2 snow in the at least partially depleted container to create a replenished, pre-charged container;
   preparing said replenished, pre-charged container for delivery to the second location, the previous use location or another location.

34. A method of creating a pre-charged container with CO2 snow at a first location for transport to a second location, comprising the steps of:
   introducing the CO2 snow into an empty or partially empty container at the first location from a source of CO2 snow at the first location;
   creating the pre-charged container at the first location;
   preparing the pre-charged container for delivery from the first location to the second location;
   the first location subsequently receiving notification from the second location or a third location that the pre-charged container with the CO2 snow is at least partially depleted or substantially depleted.

35. A method of creating a pre-charged container with $CO_2$ snow at a first location for transport to a second location and subsequently receiving the pre-charged container in a depleted state, comprising the steps of:
- introducing the $CO_2$ snow into an empty or partially empty container at the first location from a source of $CO_2$ snow at the first location;
- creating the pre-charged container at the first location; and
- preparing the pre-charged container for delivery from the first location to the second location;
- the first location subsequently receiving an at least partially depleted container without one or more perishable items therein, said at least partially depleted container defined as the pre-charged container with $CO_2$ snow therein whereby said $CO_2$ snow has at least partially sublimed;
- inspecting the at least partially depleted container;
- determining the at least partially depleted container is re-usable;
- introducing into the at least partially depleted container $CO_2$ snow to create a replenished and pre-charged container with the $CO_2$ snow; and
- preparing the replenished and pre-charged container for delivery.

* * * * *